(12) United States Patent
Slatosch et al.

(10) Patent No.: US 7,712,707 B2
(45) Date of Patent: May 11, 2010

(54) SYSTEM FOR MOUNTING A DISPLAY (75) Inventors: Gregor Slatosch, Straubenhardt (DE); Wolfgang Alexy, Pforzheim Hohenwart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 93 days.

(21) Appl. No.: 11/770,221

(22) Filed: Jun. 28, 2007

(65) Prior Publication Data
US 2008/0121762 A1 May 29, 2008

Related U.S. Application Data (63) Continuation-in-part of application No. 10/892,900, filed on Jul. 16, 2004, now Pat. No. 7,300,024.

(30) Foreign Application Priority Data
Jul. 17, 2003 (EP) .................. 03015661

(51) Int. Cl.
*G12B 9/00* (2006.01)
*A47G 29/00* (2006.01)

(52) U.S. Cl. .................. 248/27.8; 248/371; 248/919; 361/679.02; 361/679.21

(58) Field of Classification Search .......... 248/27.8, 248/27.1, 349.1, 131, 371, 919; 361/679.02, 361/679.21
See application file for complete search history.

(56) References Cited

U.S. PATENT DOCUMENTS

| 4,542,872 | A | * | 9/1985 | Marino et al. ........... 248/183.3 |
| 4,591,123 | A | * | 5/1986 | Bradshaw et al. ........ 248/179.1 |
| 4,621,782 | A | * | 11/1986 | Carlson et al. ........... 248/183.3 |
| 4,983,951 | A | * | 1/1991 | Igarashi et al. ............ 340/461 |
| 4,986,503 | A | * | 1/1991 | Kabat ...................... 248/181.2 |
| 5,016,851 | A | | 5/1991 | Koskinen |
| 5,145,137 | A | * | 9/1992 | Choi ....................... 248/288.51 |
| 6,113,047 | A | | 9/2000 | Wung |
| 6,318,694 | B1 | * | 11/2001 | Watanabe ................. 248/371 |
| 6,419,055 | B1 | * | 7/2002 | Walsh et al. ............ 188/206 R |
| 6,448,893 | B1 | * | 9/2002 | Dobberkau et al. ......... 340/461 |
| 6,717,287 | B2 | * | 4/2004 | Tengler et al. ............ 307/10.1 |

OTHER PUBLICATIONS

European Patent Office Search Report regarding Application No. EP 03 01 5661, dated Apr. 21, 2004.

* cited by examiner

*Primary Examiner*—Anita M King (57) ABSTRACT

A method that pivotably mounts a display screen includes a housing and a display holder. A bearing is disposed between the housing and the display holder. The bearing may include a bearing protrusion or curved projection extending from a sidewall of the s display holder. The bearing includes a race in communication with the housing and has a concave surface portion, and a clamping member having a convex portion. The convex portion of the clamping member may be juxtaposed with the concave surface portion of the race to form an annular channel between the clamping member and the race. The curved protrusion may be slidingly secured in the annular channel to pivotally mount the display holder relative to the housing. A bearing may support each side of the display holder.

17 Claims, 7 Drawing Sheets

SYSTEM FOR MOUNTING A DISPLAY

PRIORITY CLAIM

This application is a continuation-in-part of and claims the benefit of priority from U.S. application Ser. No. 10/892,900, filed Jul. 16, 2004, which claims the benefit of priority from European Patent Application No. 03015661.6, filed Jul. 17, 2003. U.S. application Ser. No. 10/892,900 and European Patent Application No. 03015661.6 are incorporated by reference.

BACKGROUND OF THE INVENTION

1. Technical Field

This disclosure relates to a display holder. In particular, this disclosure relates to a display assembly for pivotally mounting a display in an environment subject to vibration and shock.

2. Related Art

Vehicles may be equipped with computer equipment to provide the driver and/or occupants with information. Such computer equipment necessarily includes a display screen for providing visual images to the driver or occupants of the vehicle. Some display devices are temporarily affixed to an inside portion of the windshield with suction-cup arrangements. Other display devices are mounted to the dashboard with fasteners. Such mounting provisions, however, do not provide an aesthetically pleasing appearance.

In some vehicles, computer systems and display devices may be subject to a high degree of vibration and shock. In such situations, the mounting fixtures do not maintain the position of the display screen or permit the display to be easily and quickly adjusted. A need exists for a system for mounting a display screen that permits the vehicle occupant to easily and quickly adjust the position of the display screen while maintaining the position of the display screen once adjusted.

SUMMARY

A method that pivotably mounts a display screen includes a housing and a display holder. A bearing is disposed between the housing and the display holder. The bearing may include a bearing protrusion or curved projection extending from a sidewall of the display holder. The bearing includes a race in communication with the housing and has a concave surface portion, and a clamping member having a convex portion. The convex portion of the clamping member may be juxtaposed with the concave surface portion of the race to form an annular channel between the clamping member and the race. The curved protrusion may be slidingly secured in the annular channel to pivotally mount the display holder relative to the housing. A bearing may support each side of the display holder.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Vehicles may be equipped with computer equipment to provide the driver and/or occupants with information. Computer equipment may include telematic systems, navigation systems for providing route guidance, and audio/video entertainment systems. The display screens of vehicle computer equipment may be conveniently adjustable by the user and may maintain its position when subject to vibration, shock and temperature variation.

Figure 1:
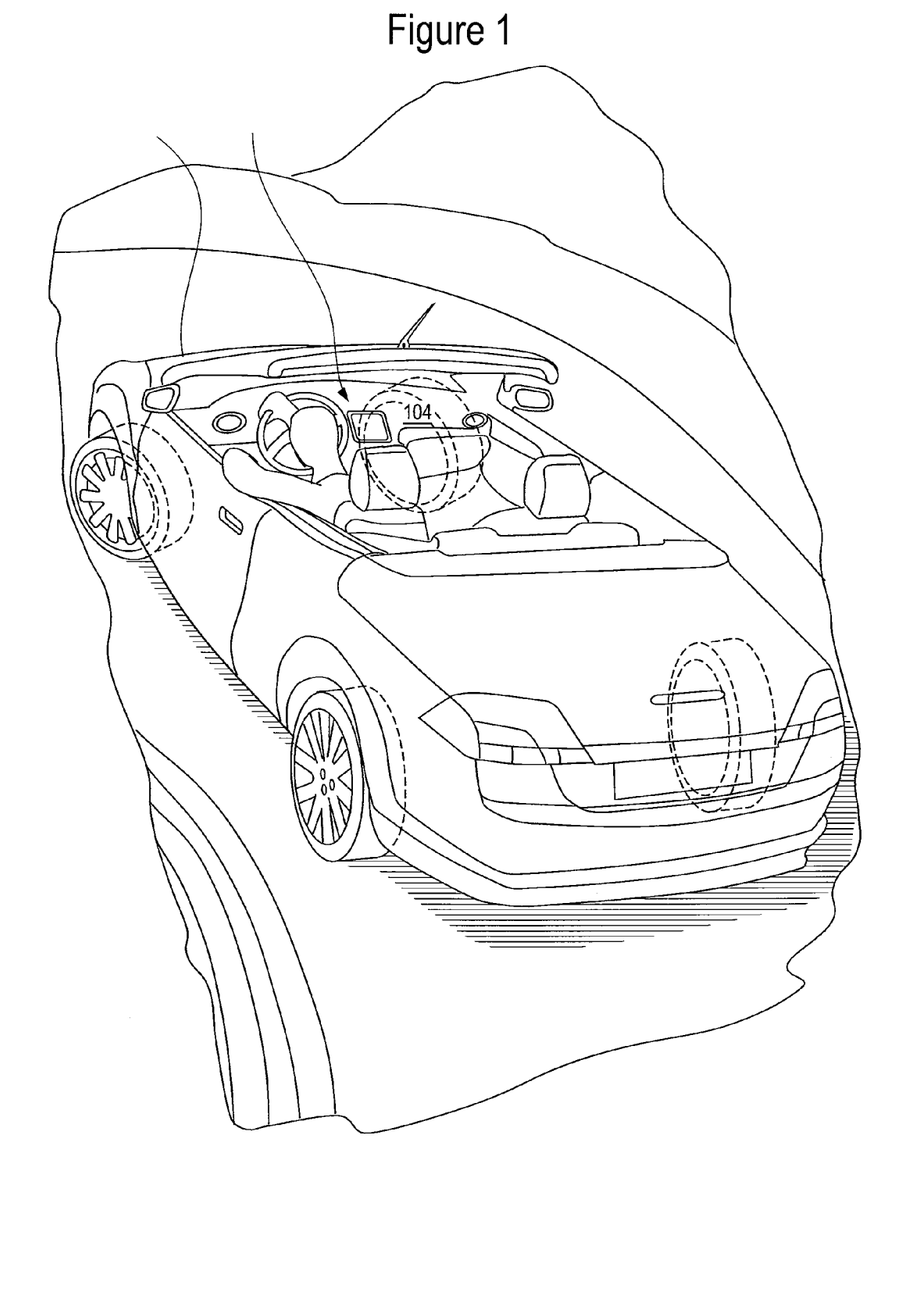
FIG. 1 is a mounting assembly in a vehicle dashboard.

FIG. 1 shows a mounting assembly 100 installed in a vehicle 106 dashboard 104. The mounting assembly 100 may be recessed into a cut-out area or cavity of the dashboard 104. In some applications, the mounting assembly may be fastened to a surface of the dashboard 104.

Figure 2:
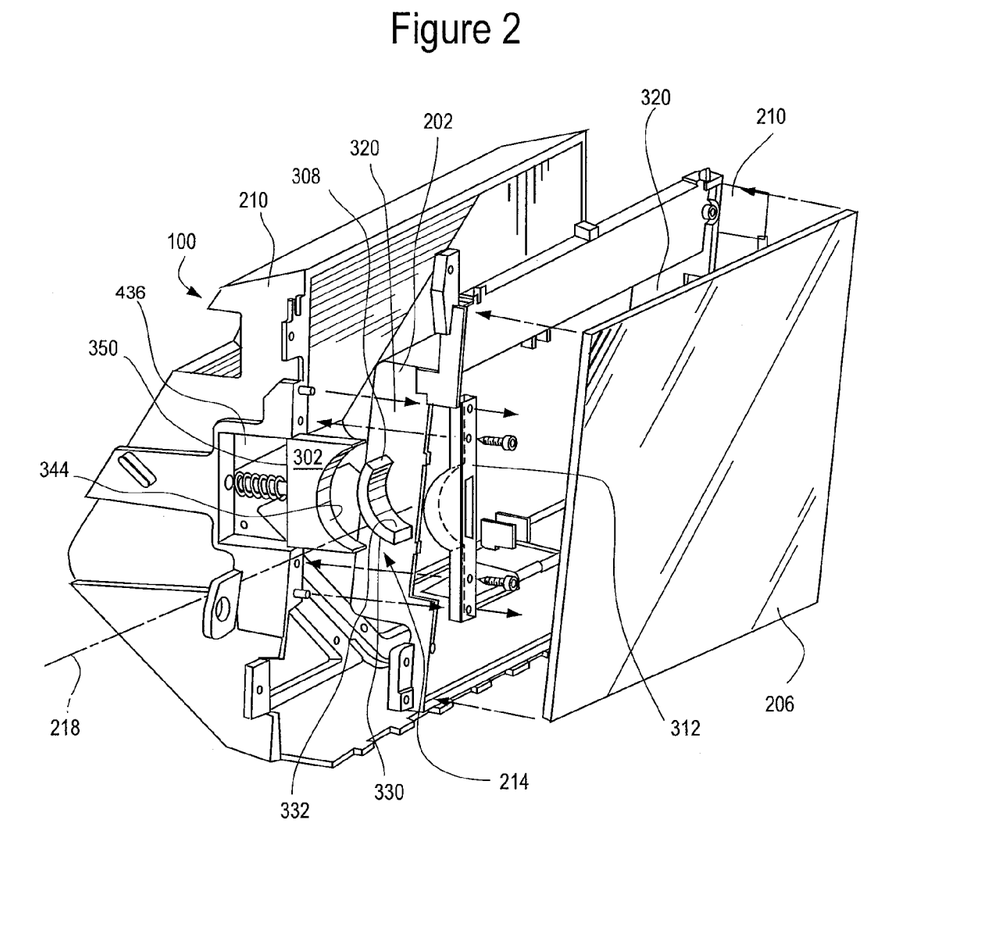
FIG. 2 is a mounting assembly.

FIG. 2 shows components of the mounting assembly 100, which may include a display holder 202 and a visual output device, such as flat-screen display panel 206. The flat-screen display panel 206, such as a liquid crystal display (LCD), may be attached to the display holder 202 by fasteners 210 or clips. The display holder 202 may be pivotally mounted to a housing 210. The housing 210 may be an integrally formed rigid structure mounted in or to the dashboard 104 of the vehicle 106. The housing 210 may be part of the dashboard 104 of the vehicle 106. The housing 210 may be formed of sheet metal or hard plastic or other durable material.

The mounting assembly 100 may be installed on a device or structure that transports persons or things. Such vehicles may be subject to many temperature ranges including from −40 degrees Centigrade to +70 degrees Centigrade. The vehicles may be subject to vibrations and G-forces caused by movement, such as a rapid acceleration and deceleration, a rapid maneuvering, movement along uneven or bumpy terrain, and other causes.

The mounting assembly 100 may include a bearing assembly 214. The bearing assembly 214 may allow the display holder 202 to pivot about a pivot axis 218 relative to the housing 210. The pivot axis 218 may be positioned behind or on the "housing side" of the flat display screen 206. The bearing assembly 214 may maintain the display holder 202 at a fixed but adjustable angular position when the mounting assembly 100 is subject to vibration or changes in temperature.

Figure 3:
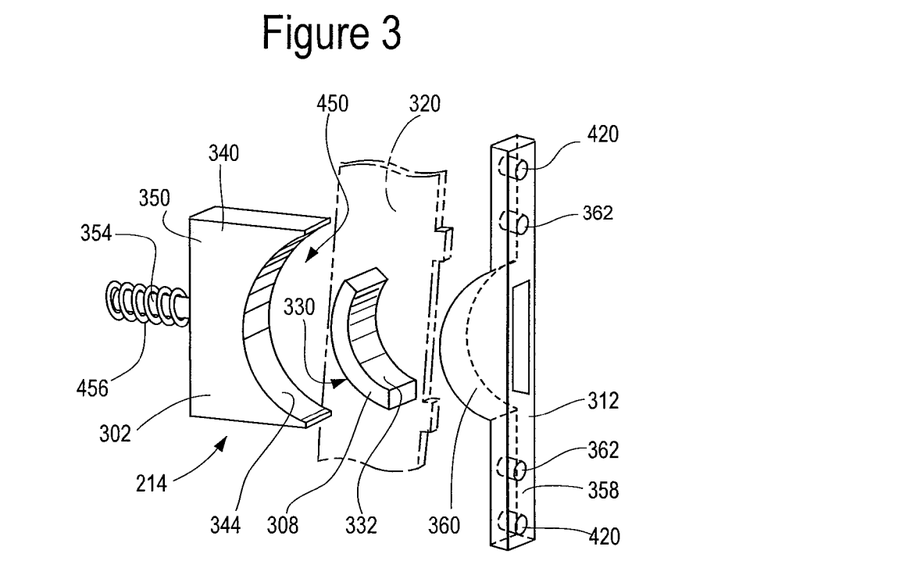
FIG. 3 is a bearing assembly.

FIG. 3 is the bearing assembly 214. The bearing assembly 214 may include a semi-annular race 302, a bearing protrusion 308, and a fixing member 312. The bearing assembly 214 may be positioned near one or both lateral sidewalls 320 of the display holder 202. The bearing protrusion 308 may be integrally formed with the respective lateral sidewall 320. The pivot axis 218 may pass through the center of a circle defined by the radius of curvature of the bearing protrusion 308.

When two bearing assemblies 214 are used, each sidewall 320 may include a corresponding bearing protrusion 308. When a single bearing assembly 214 is used, a support may be provided.

In some devices, the bearing protrusions 308 may be separate components and may be attached to the sidewalls 320 with fasteners, chemical adhesive, welds, or other components. The bearing protrusions 308 may have an outer peripheral convex surface 330 and an inner peripheral concave surface 332, which may be substantially parallel in contour to the outer peripheral convex surface. The bearing protrusion 308 may have a generally concavo-convex cross-sectional shape.

The semi-annular race 302 may have a generally rectangular solid body portion 340. A leading edge of the semi-annular race 302 may include a curved or concave surface 344 having a radius of curvature substantially equal to a radius of curvature of the bearing protrusion 308. A distal end 350 of the body portion 340 may include a shaft or cantilever stud 354 extending outwardly from the body portion 340. The shaft 354 may be threaded or may have a smooth surface.

The fixing or clamping member 312 may include a rectangular bar-shaped portion 358 and a convex semi-circular projection 360 integrally formed with the fixing member 312 at about a mid-section of the bar-shaped portion. The bar-shaped portion 358 may include a first set of apertures 362 for securing the fixing member 312 to the housing 210.

Figure 4:
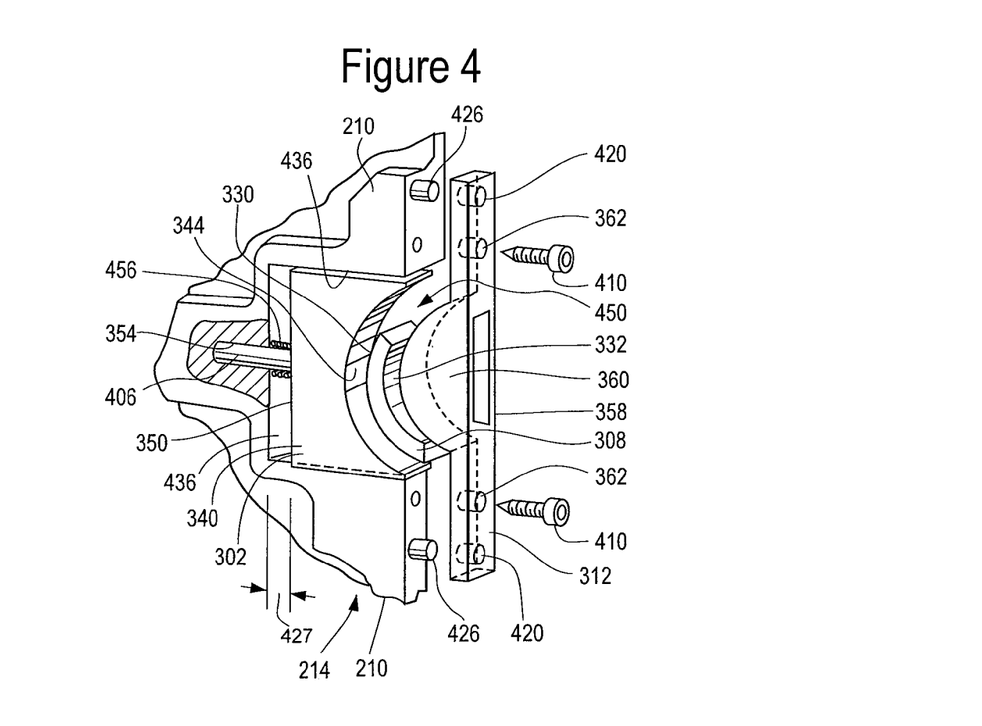
FIG. 4 is an assembled bearing assembly.

FIG. 4 shows the body portion 340 of the semi-annular race 302 and the bearing protrusion 308 mounted in the housing 210. A through bore 406 may be disposed in the housing 210 and may be configured to receive the shaft 354 to fixedly mount the body portion 340 to the housing 210. Tensioning bolts or fasteners 410 may be received through the apertures 362 to secure the fixing member 312 to the housing 210. A set of alignment apertures 420 may receive a pair of corresponding studs 426 to align the fixing member 312 with the housing 210. The tensioning bolts 410 may establish a spacing 427 between the distal end of the body portion 340 and a marginal edge of a housing recess 436

An annular channel 450 may be formed between the convex semi-circular projection 360 and the concave surface 344 of the semi-annular race 302 when the fixing member 312 is secured to the housing 210. The annular channel 450 may receive and guide the bearing protrusion 308 to support the display holder 202 at a specific angular orientation. The bearing protrusion 308 may be interposed between convex semi-circular projection 360 and the concave surface 344 of the semi-annular race 302, and may move or slide along the annular channel 450 as the display holder 202 is pivoted or tilted.

An elastic or resilient member, such as coil spring 456, may be fitted about a portion of the shaft 354 to provide a bias against the distal end of the body portion 340. In some devices, one or more spring disks may apply the biasing force. One or more stacked spring disks may provide a desired amount of biasing force against the body portion 340. The gauge metal and the spring tension of the coiled spring 456 may be selected to provide a biasing force. The coil spring 456 or spring disk may be compressed as the shaft 354 is received within the throughbore 406 to secure the semi-annular race 302 within the housing 210. The biasing force may urge the body portion 340 toward the convex semi-circular projection 360 to compress the bearing protrusion 308 within the annular channel 450.

The bearing protrusion 308 may be fixed within the annular channel 450 by a frictional fit, and may have some limited movement along the annular channel 450. The movement may permit the display holder 202 to pivot about the pivot axis 218. The biasing force provided by the coil spring 456 or spring disk may determine the amount of force necessary to change the pivot angle of the display holder 202. The frictional force maintaining the display holder 202 in a fixed but adjustable position may be increased by providing a bearing assembly 214 on each of the lateral sidewalls 320 of the display holder 202.

In environments where the vehicle 106 may be subject to greater vibration and shock, tightening the tensioning bolts 410 may generate additional pressure against the bearing protrusion 308. Thus, more force may be required to adjust the pivot angle of the display holder 202 or to dislodge the display holder from its current angular position. Tightening the tensioning bolts 410 may urge the body portion 340 of the race 302 further backward within housing recess 436 to further compress the coil spring 456 or spring disks.

In some devices, the semi-annular race 302 may be fixedly mounted to the housing 210 or may be part of the housing. The semi-annular race 302 may be fixed, and the coiled spring 456 and/or spring disks may be omitted. The pressure applied by the tensioning bolts 410 may determine the amount of friction applied to the bearing protrusion 308 disposed in the channel 450.

The bearing assembly 214 may be made from materials having a low coefficient of expansion. The coefficient of friction between the components of the bearing assembly 214 may remain relatively constant throughout the temperature range to which the vehicle is exposed. Accordingly, the amount of force required to adjust the pivot angle of the display holder 202 or dislodge the display holder from its current angular position may remain relatively constant throughout the operational temperature range. The frictional forces between the components of the bearing assembly 214 may depend upon the surface area of the bearing protrusion 308 that contacts the convex semi-circular projection 360 and concave surface 344 of the semi-annular race 302. The frictional forces may also depend upon the type of material used and the durometer or relative hardness or resiliency of the material. The selection of the bearing assembly material may depend upon the weight of the display holder 202 and display panel 206, and the mounting assembly environment.

Figure 5:
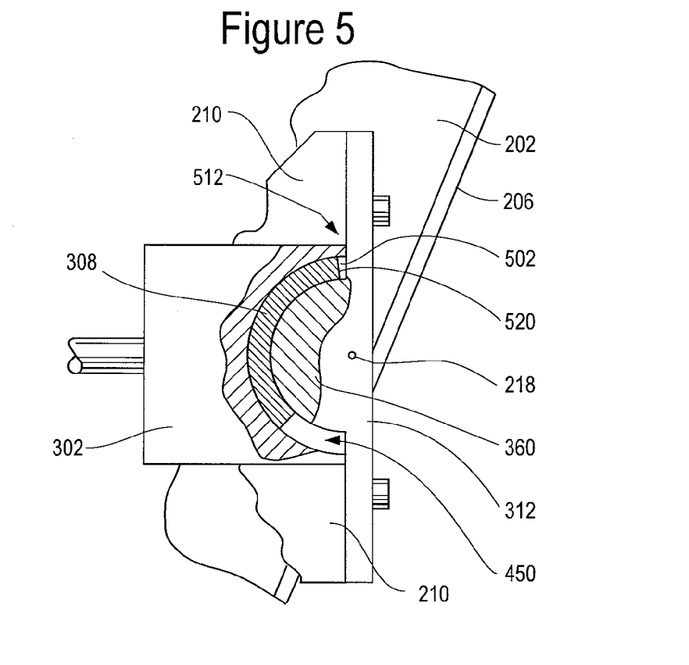
FIG. 5 is a bearing assembly and display holder in a first position.

FIG. 5 shows the display holder 202 and the display panel 206 tilted downward at maximum angle. An upper stop 502 may be formed on an inside surface of the bar-shaped portion 358 adjacent the convex semi-circular projection 360. The upper stop 502 may limit the displacement of the bearing protrusion 308 within the annular channel 450 to limit the downward angular tilt of the display holder 202 and flat screen display panel 206. The upper stop 502 may be located near an upper arcuate extremity 512 of the semi-arcuate race 302 to limit the movement of the bearing protrusion 308 within the channel 450. In some applications, the upper stop 502 may be omitted, and the displacement of the bearing protrusion 308 within the annular channel 450 may be limited when an upper end face 520 of the bearing protrusion 308 contacts the inside surface of the bar-shaped portion 358.

Figure 6:
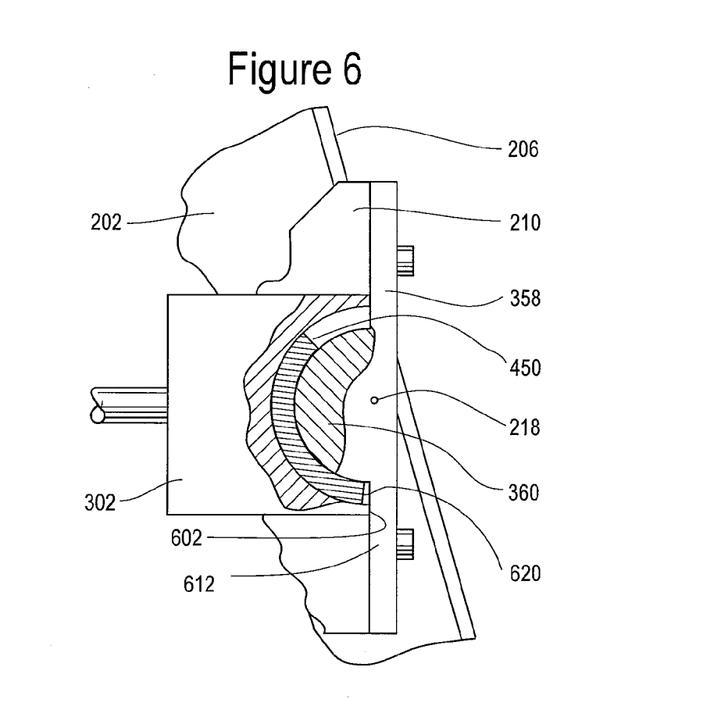
FIG. 6 is a bearing assembly and display holder in a second position.

FIG. 6 shows the display holder 202 and display panel 206 tilted upward at maximum angle. A lower stop 602 may be formed on an inside surface of the bar-shaped portion 358 adjacent the convex semi-circular projection 360. The lower stop 602 may limit the displacement of the bearing protrusion 308 within the annular channel 450 to limit the upward angular tilt of the display holder 202 and flat screen display panel

206. In some devices, the lower stop 602 may be omitted, and the displacement of the bearing protrusion 308 within the annular channel 450 may be limited when a lower end face 620 of the bearing protrusion 308 contacts the inside surface of the bar-shaped portion 358. The lower stop 602 may be located near a lower arcuate extremity 612 of the semi-annular race 302 to limit movement of the bearing protrusion 308 within the channel 450.

Figure 7:
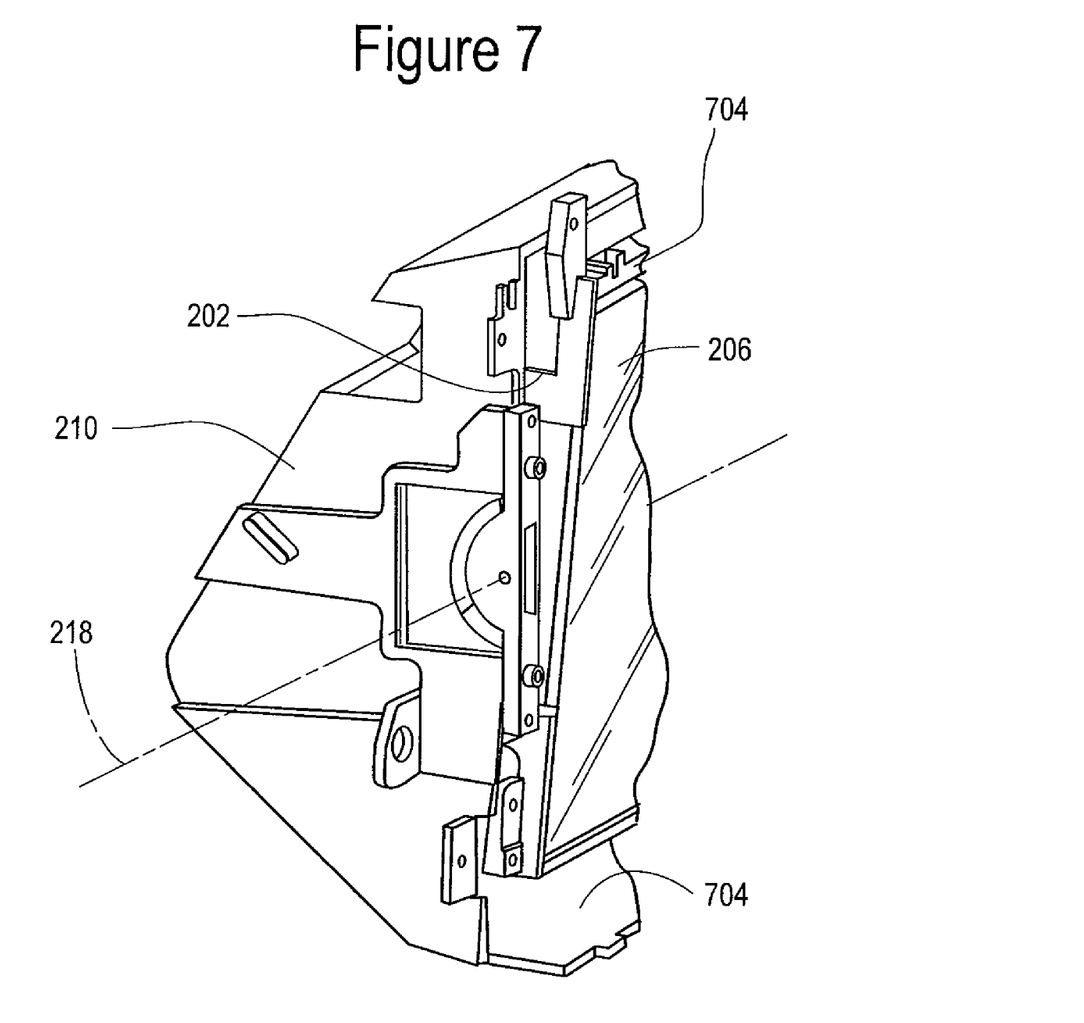
FIG. 7 is an assembled mounting assembly and display panel.

FIG. 7 shows the display holder 202 fastened to bearing assembly 214 in an assembled state. The flat-screen display panel 206 may be tilted downwardly about the pivot axis. In some devices, the flat-screen display panel may be rearwardly recessed in the display holder 202 toward the back of the housing 210 by a predetermined distance. The displacement of the display panel may permit the pivot axis 218 to be coincident with the plane of the flat-screen display panel 206. The free space above and below marginal edges 704 of the flat-screen display 206 may be minimized by placing the pivot axis 218 about coincident with the plane of the flat-screen display panel 206.

If the display panel 206 is displaced so that the pivot axis is positioned in front of the plane of the flat-screen display panel, the display holder 202 may be mounted easily. In some devices, the pivot axis 218 may be less than about 20 millimeters behind the plane of the flat-screen display panel 206.

Figure 8:
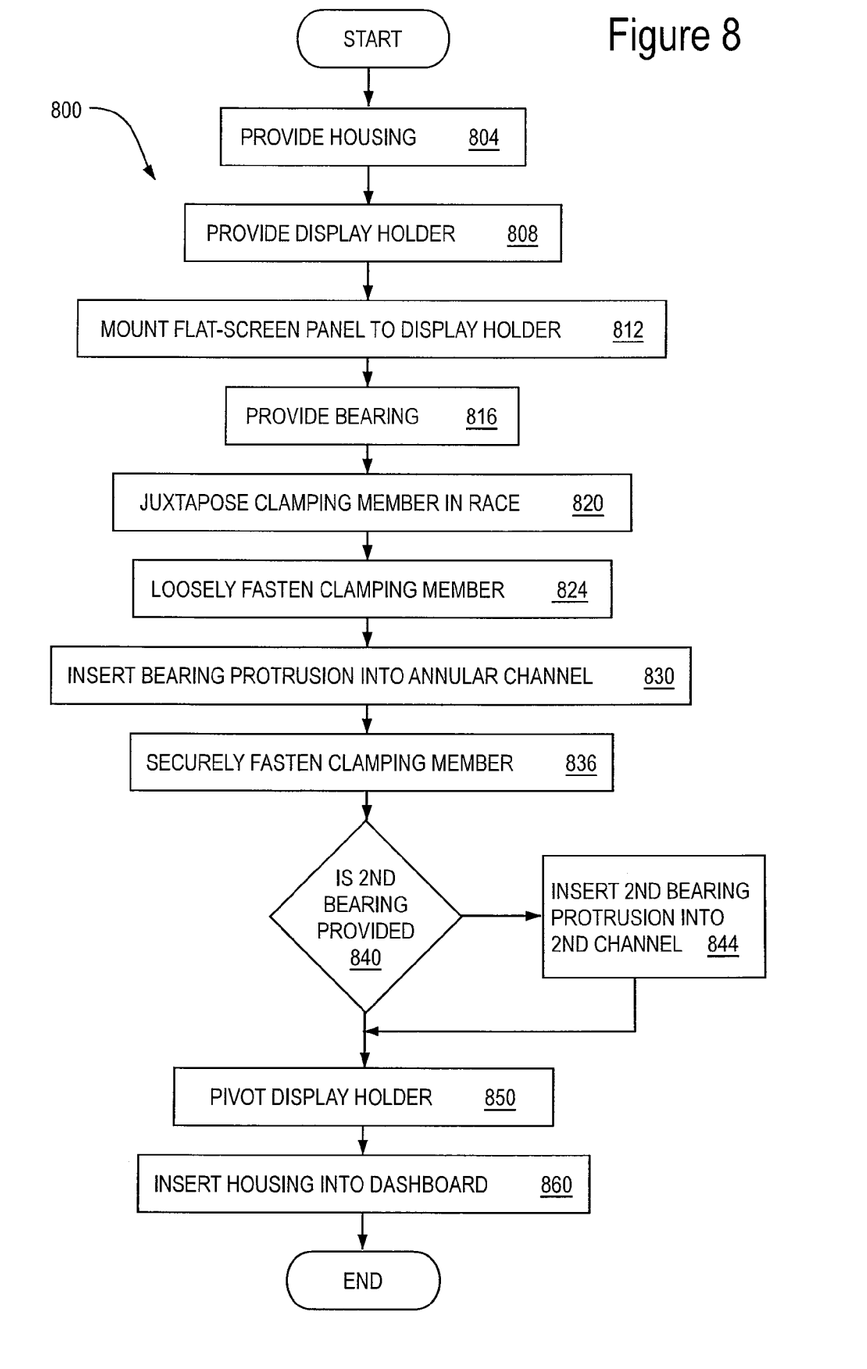
FIG. 8 is a process for mounting a display panel.

FIG. 8 is a process 800 that mounts a display panel to a vehicle. The process may include providing a housing (Act 804) and providing a display holder (Act 808). A flat-screen display panel may be fixedly mounted to the display holder (Act 812). A bearing may be interposed (Act 816) between the housing and the display holder. The bearing may include a bearing projection or curved projection extending from a sidewall of the display holder, a race in communication with the housing and a clamping member having a convex portion. The race may have a concave surface portion, The convex portion of the clamping member may be juxtaposed with the concave surface portion of the race (Act 820) by loosely fastening the clamping member to the race (Act 824). When juxtaposed, the space between the convex portion of the clamping member and the concave surface portion of the race may form an annular channel. The bearing protrusion extending from the sidewall of the display holder may be inserted into the annular channel (Act 830). The clamping member may be securely fastened (Act 836) to the race or the housing to interpose the bearing protrusion in the annular channel. If a second bearing assembly is used (Act 840) on an opposite sidewall of the display holder, a second bearing protrusion of a second sidewall may be inserted into a corresponding second annular channel (Act 844). The display holder may be pivoted relative to the housing (Act 850) to adjust the angle of the display panel. The housing may be inserted or otherwise secured in the dashboard of a vehicle (Act 860).

Figure 9:
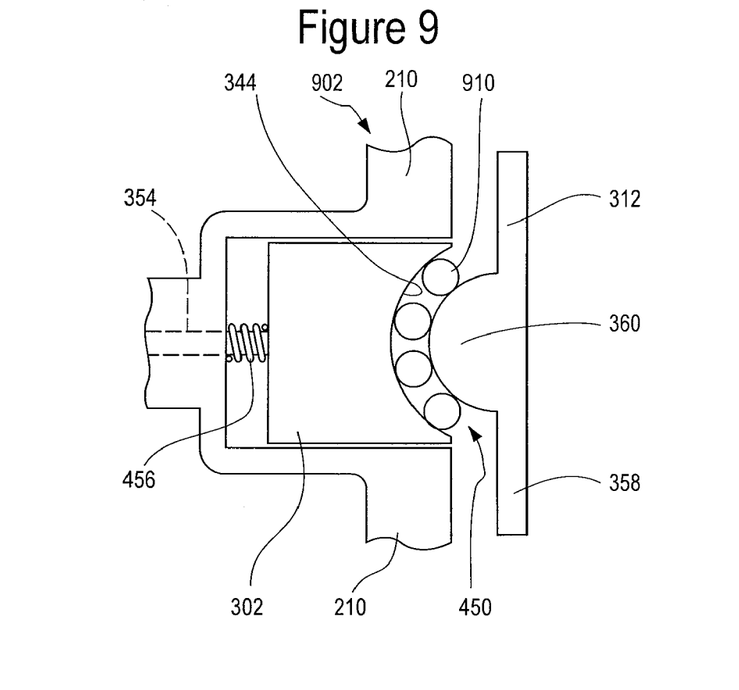
FIG. 9 is a bearing assembly.

FIG. 9 shows a bearing assembly 902 that may be used. The bearing protrusion of FIGS. 2-4 may be replaced with a plurality of pins or studs 910. The cylindrical studs 910 shown in FIG. 9 may be positioned on one or both lateral sidewalls 320 of the display holder 302, and may be a unitary part of the respective lateral sidewalls. In some devices, the cylindrical studs 910 may be separate components and may be connected to the sidewalls 320 with fasteners, chemical adhesive, welds or other components.

The placement pattern of the cylindrical studs 910 may correspond to the contour of the annular channel 450 formed between the convex semi-circular projection 360 and the concave surface 344 of the semi-annular race 302. The annular channel 450 may receive and guide the cylindrical studs 910 to support the display holder 202. The cylindrical studs 910 may be interposed between the convex semi-circular projection 360 and the concave surface 344 of the semi-annular race 302 and may move along the annular channel 450 as the display holder is moved. The surface area of the cylindrical studs 910 in contact with the walls of the annular channel 450 may determine the friction between the components. The force applied to the components of the bearing assembly 902 by the coiled spring 456 or spring disks may be adjusted to maintain the display holder 202 and display panel 206 in a fixed but adjustable position when subject to vibration and shock.

Figure 10:
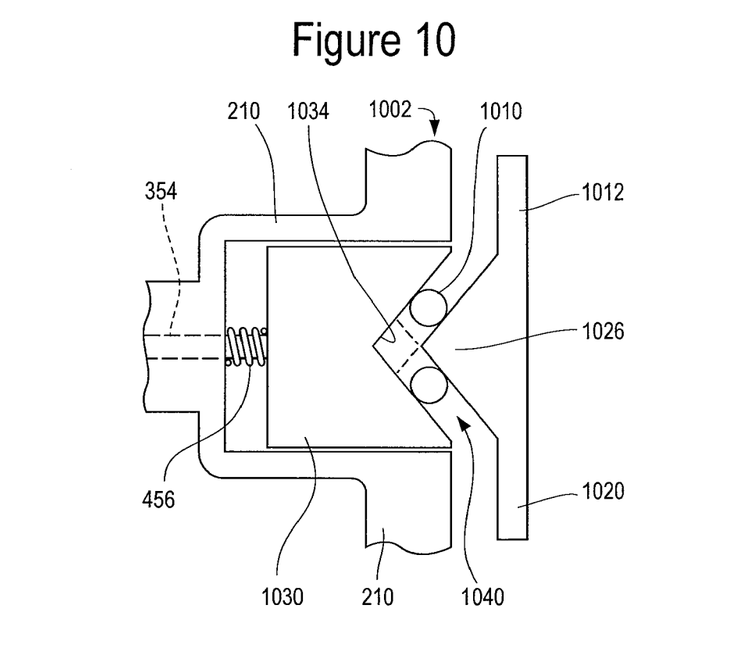
FIG. 10 is a bearing assembly.

FIG. 10 shows a bearing assembly 1002. The bearing protrusion of FIGS. 2-4 may be replaced with two pins or studs 1010. The cylindrical studs 1010 may be in contact with one or both lateral sidewalls 320 of the display holder 202, and may be a unitary part of the respective lateral sidewalls 320 or may be attached to the lateral sidewalls.

A fixing member 1012 may include a rectangular bar-shaped portion 1020 and a convex triangular projection 1026 integrally formed with the fixing member at about a mid-section of the bar-shaped portion 1020. A race 1030 may be mounted in the housing 210. The race 1030 may include a corresponding concave triangular recess 1034. A substantially V-shaped channel 1040 may be formed between the triangular projection 1026 and the corresponding triangular recess 1034 when the fixing member 1012 is secured to the housing 210. The V-shaped channel 1040 may receive and guide the two cylindrical studs 1010 to support the display holder 202. The two cylindrical studs 1010 may be interposed between the triangular projection 1026 and the corresponding triangular recess 1034 of the race 1030, and may move along the substantially V-shaped channel 1040 as the display holder 202 is pivoted or tilted. The channel 1040 may be formed as two straight legs with an angle between the legs being less than ninety degrees, more than ninety degrees, or equal to ninety degrees.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for mounting a display screen, the method comprising the steps of:
    pivotally mounting a display holder to a housing;
    fixedly mounting the display screen to the display holder;
    providing a bearing between the housing and the display holder, the bearing including a first component in communication with the display holder and a second component in communication with the housing, the bearing permitting the display holder to pivot relative to the housing;
    providing a second bearing including a third component extending from a second sidewall of the display holder, and a fourth component in communication with the housing; and
    wherein the first component is in communication with a first sidewall of the display holder.

2. The method according to claim 1, comprising attaching the housing to a surface of a vehicle dashboard.

3. The method according to claim 1, comprising mounting the housing in a portion of a vehicle dashboard.

4. The method according to claim 1, comprising recessing the housing into a portion of a vehicle dashboard.

5. A method for pivotably mounting a display screen, the method comprising the steps of:
- fixedly mounting a display screen to a display holder;
- disposing a bearing between a housing and the display holder, the bearing including a curved protrusion extending from a sidewall of the display holder, a race in communication with the housing and having a concave surface portion, and a clamping member having a convex portion;
- juxtaposing the convex portion of the clamping member with the concave surface portion of the race to form an annular channel between the clamping member and the race;
- resiliently urging the race against the clamping member to provide the curved protrusion with a frictional fit within the annular channel; and
- slidingly securing the curved protrusion in the annular channel to pivotably mount the display holder relative to the housing.

6. The method according to claim 5, comprising attaching the housing to a surface of a vehicle dashboard.

7. The method according to claim 5, comprising mounting the housing in a portion of a vehicle dashboard.

8. The method according to claim 5, comprising recessing the housing into a portion of a vehicle dashboard.

9. The method according to claim 5, where the annular channel is formed between the concave surface portion of the race and the convex portion of the clamping member.

10. The method according to claim 5, where the curved protrusion is a unitary part of the sidewall of the display holder.

11. The method according to claim 5, where the curved protrusion is coupled to the sidewall of the display holder.

12. The method according to claim 5, comprising resiliently urging the clamping member against the race to provide the curved protrusion with a frictional fit within the annular channel.

13. The method according to claim 5, comprising tightening one or more tensioning bolts to urge the clamping member against the race.

14. The method according to claim 5, comprising providing a stop near opposite arcuate extremities of the curved protrusion to limit movement of the curved protrusion within the annular channel.

15. The method according to claim 5, where the curved protrusion of the bearing is in communication with a first sidewall of the display holder.

16. The method according to claim 15, further comprising providing a second bearing having a second curved protrusion extending from a second sidewall of the display holder, a second race in communication with the housing and having a concave surface portion, and a second clamping member having a convex portion.

17. A method for pivotably mounting a display screen in a vehicle dashboard, the method comprising the steps of:
- fixedly mounting a display screen to a display holder;
- disposing first means for bearing between a housing and a first wall of the display holder;
- disposing second means for bearing between the housing and a second wall of the display holder, each means for bearing including a curved protrusion extending from respective walls of the display holder, a race in communication with the housing and having a concave surface portion, and a clamping member having a convex portion;
- juxtaposing the convex portion of the clamping member with the concave surface portion of the race to form an annular channel between the clamping member and the race of each bearing;
- resiliently urging the race against the clamping member to provide the curved protrusion with a frictional fit within the annular channel; and
- slidingly securing the curved protrusion in the respective annular channel to pivotally mount the display holder relative to the housing.

* * * * *